United States Patent [19]

Brym et al.

[11] Patent Number: 4,518,263
[45] Date of Patent: May 21, 1985

[54] SPLATTER SHIELD FOR USE WITH A DRINK MIXER

[75] Inventors: Stanley J. Brym, Torrington; Bruno M. Valbona, Farmington, both of Conn.

[73] Assignee: Dynamics Corporation of America, Greenwich, Conn.

[21] Appl. No.: 626,935

[22] Filed: Jul. 2, 1984

[51] Int. Cl.³ ................................................ B01F 7/26
[52] U.S. Cl. ..................... 366/206; 366/197; 366/347; 366/601
[58] Field of Search ............... 366/197, 200, 201, 206, 366/207, 347, 601

[56] References Cited

U.S. PATENT DOCUMENTS 2,585,822  2/1952  Myers .................................. 366/206
3,292,912  12/1960  Stubler ................................ 366/197
4,351,612  9/1982  Valbona et al. ...................... 366/197

Primary Examiner—Timothy F. Simone
Attorney, Agent, or Firm—Sixbey, Friedman & Leedom

[57] ABSTRACT

A splatter shield (42) is positioned on a frontwall (34) of a hollow upright standard (14) of an electric drink mixer (10). The splatter shield includes a one-piece body (44) having a top flange (60) bent to form a rear flange (68) which engages an inner surface (38) of the hollow standard frontwall to cooperate with a mounting bolt (46) extending through an aperture (48) in the body into engagement with the frontwall to mount the splatter shield on the standard. A switch actuator mechanism (30) for activating a drink mixer motor (18) via a switch assembly (36) extends through a slot (32) defined in the frontwall and a slot (58) in the body to be contacted by a container (24) supported on a container support (54) which is also one-piece with the body.

7 Claims, 3 Drawing Figures

SPLATTER SHIELD FOR USE WITH A DRINK MIXER

DESCRIPTION

TECHNICAL FIELD

The present invention relates in general to electric drink mixers, and more particularly to an improved splatter shield for use with electric drink mixers.

BACKGROUND ART

Electric drink mixers have been used for many years in homes and commercial establishments for mixing a variety of beverages. The conventional mixer generally includes a base from which rises a substantially vertical standard, and an electric drive motor projects over the base from the top of the standard. The motor carries a depending stirring arm which extends into a container supported by suitable support hardware attached to the front face of the standard. The front face of the standard is also generally provided with openings for projecting switch actuators which control electric circuitry mounted internally within the standard.

During operation of an electric drink mixer, the stirring arm rotates at high speeds resulting in some splattering of the stirred liquid, particularly if the liquid container is overfilled. Also, once a drink is mixed, mixer operators have a tendency to remove the drink container before rotation of the stirring arm ceases. This causes the stirring arm to throw liquid against the front face of the standard.

The splattered product should not be permitted to remain on any portion of the drink mixer long enough to present a contamination problem. Drink mixers used in commercial establishments are subject to stringent sanitation codes, and thus contamination is an extremely important consideration for drink mixers which are intended for commercial use. Therefore, some means should be provided to protect the mixer standard and the mixer hardware from contact by splattered product and thereby protect the drink mixer from contamination problems. However, no matter what means is used to effect this required protection, that means, itself, is subject to contamination and therefore must be amenable to being cleaned by a user.

However, mere amenability to cleaning is not sufficient, and such protecting devices should be easy enough to remove, to clean, to sterilize, to polish, and to replace so that such steps are likely to be carried out. If it is a difficult task to effect any of these steps, proper cleaning of the protection means may be omitted thereby creating a potential contamination problem. Furthermore, a drink mixer that has not been properly cleaned and polished may not present a pleasing appearance which is undesirable, especially for a commercial establishment.

In the past, the contamination problem experienced by electric drink mixers as a result of liquid splatter has been recognized. For example, splatter shields of the type disclosed by Oswell in U.S. Pat. No. 2,134,261 and Valbona et al in U.S. Pat. No. 4,351,612 have been developed to prevent liquid from splashing onto various surfaces. The Oswell splatter shield occupies a position directly behind the upper portion of a standard to prevent liquid from splashing from a container on the machine against the wall immediately to the rear of the machine. However, the Oswell splatter shield does not protect the machine itself which is also subject to contamination. The Valbona et al splatter shield does not protect the drink mixer standard and is removably secured to a drink mixer standard by a container support assembly and a removable switch actuator assembly which also controls operation of a motor associated with the drink mixer.

While effective in protecting the drink mixer and switch assembly from splashed product, the Valbona et al device requires several separate operations to remove, clean and replace a switch actuator assembly, a container support assembly and finally the splatter shield itself. The numerous steps involved may make the cleaning of the Valbona et al splatter shield an undesirable task. Furthermore, the several parts involved in this splatter shield may increase the risk of losing one part during the cleaning process and may also increase the possibility of damaging one part during a cleaning process thereby diminishing durability and reliability of the device.

A plurality of processes may be required to manufacture the various parts of the Valbona et al splatter shield, and once manufactured, these parts must be assembled, either increasing the cost of manufacture or requiring a customer to assemble the device. None of these requirements is entirely desirable.

The drink mixer disclosed by Myers in U.S. Pat. No. 2,585,822 includes a front plate for guiding a container to and from its operative position around an agitator. The plate is secured by screws to a standard and has a hook integral therewith for supporting a container. While the Myers plate itself appears to be easier to manufacture than the Valbona et al splatter shield, the Myers plate is intended to be a part of the switch assembly and includes a switch mechanism fixedly secured by welding or soldering to the back face of the plate. Thus, every time the plate is cleaned, the switch mechanism should be disassembled and then reassembled after cleaning. The Myers device is thus even more subject to the above-discussed cleaning-associated drawbacks than the Valbona et al device.

Even further than this, the Myers device may be difficult to assemble at the factory and may also be difficult to service. Thus, any potential savings resulting from the one-piece nature of the Myers plate may be offset by other difficulties associated with this device.

DISCLOSURE OF THE INVENTION

It is a main object of the present invention to provide a novel and improved splatter shield for use with an electric drink mixer to protect the drink mixer and which is inexpensively manufactured while also being easily mounted on and removed from the drink mixer.

It is another object of the present invention to provide a novel and improved splatter shield for use in protecting an electric drink mixer which can be assembled on and disassembled from the drink mixer without disturbing other elements of the drink mixer.

It is another object of the present invention to provide a novel and improved splatter shield for protecting the front wall of an electric drink mixer in which a one-piece body performs a plurality of different functions heretofore performed by a plurality of separate elements.

It is a specific object of the present invention to provide a novel and improved splatter shield for protecting a front wall of a drink mixer in which no part of the switch mechanism is included in the splatter shield or in the mounting thereof on the drink mixer front wall thereby permitting mounting and removal of the splatter shield without endangering the switch assembly associated with the drink mixer.

These and other objects are accomplished by the splatter shield embodying the present invention. The splatter shield includes a one-piece body having a mounting means for engaging the mixer front wall adjacent to a slot in the mixer through which a switch actuating mechanism extends. The splatter shield body also includes a container support for supporting a container in position to engage the switch actuator mechanism. The splatter shield is formed from a single element which performs several functions and thus can be manufactured in an inexpensive process and easily assembled onto a mixer. The drink mixer switch actuator mechanism extends through a slot in the splatter shield and is not required to support the shield on the mixer. Thus, the shield is easily removed from the mixer for cleaning, is easily cleaned, and is easily replaced on the mixer, all without requiring the switch assembly or switch actuator mechanism to be disturbed. The simple nature of the splatter shield of the present invention permits it to overcome all of the above-discussed problems by being easy for a user to clean, inexpensive to manufacture as compared to prior art splatter shields, and durable and reliable as no delicate element, such as the switch actuator mechanism is required to hold the splatter shield in place on the drink mixer.

It is a more specific object of the present invention to provide a splatter shield for use with an electric drink mixer of the type having an upright hollow standard in which a motor controlling switch mechanism is located, and which includes a locator pin on a frontwall of the standard. The splatter shield includes a body having a mounting bolt receiving aperture therein through which a mounting bolt extends into engagement with the standard frontwall. The body also includes a flange which extends rearwardly of the body through a slot in the standard into engagement with the frontwall to cooperate with the mounting bolt to mount the splatter shield on the standard. The locator pin is received in an aperture to help orient and position the splatter shield. Container support means and positioning means are also integral with the body, and a slot is defined in the body through which the switch actuator mechanism extends in spaced relation to the body. A button on the actuator mechanism is engaged by a container to operate the motor, and a splatter shield flange extends in front of the button to prevent material from entering the standard through the slots. A mounting pad and vibration dampers position the splatter shield on the mixer and the vibration dampers and locating pin are located between the mounting pad and the switch actuator mechanism receiving slot. Body positioning means can also be included on the flange to properly locate the splatter shield body with respect to the frontwall.

BEST MODE FOR CARRYING OUT THE INVENTION

Figure 1:
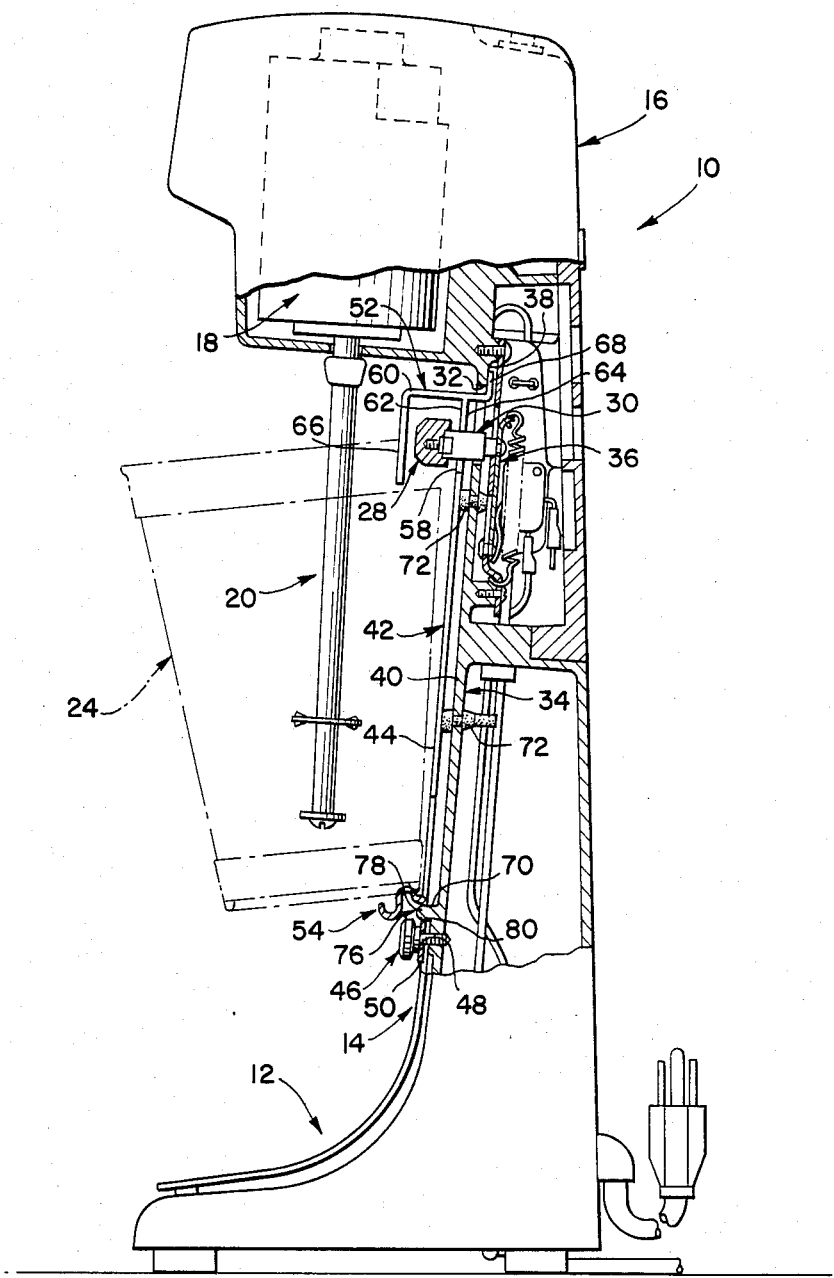
FIG. 1 is a sectional elevation view showing the splatter shield embodying the present invention in place on an electric drink mixer.

Shown in FIG. 1 is an electric drink mixer 10 having a laterally projecting base 12 from which a hollow standard 14 extends upwardly to support a laterally projecting motor housing 16 in which a motor 18 is supported. The motor drives a stirring arm 20 which depends from the motor housing toward the base in spaced relationship to the standard for agitating a drink contained in a container 24, shown in phantom lines positioned on the drink mixer. The motor is turned on when the container engages a button 28 of a switch actuator mechanism 30 which extends through a slot 32 defined in a frontwall 34 of the standard to activate a switch assembly 36 located inside hollow standard 14, and which is supported adjacent to inner surface 38 of the frontwall. The motor is turned on when the switch actuator mechanism 30 is raised by mounting of the container shown in phantom lines in FIG. 1.

Front surface 40 of the standard frontwall is protected by a splatter shield 42. The splatter shield includes a one-piece body 44 which covers a portion of the frontwall, supports the container and is easily manufactured and assembled with the drink mixer. Body 44 is mounted on the standard frontwall by a mounting bolt 46 which extends through an aperture 48 defined in the body 44 adjacent to a bottom edge 50 of the body and a mounting means 52 which is one-piece with the body and which is located at the edge of the body opposite to the bottom edge 50. Body 44 also includes a container support 54 which is also one-piece with the body and which supports the container on the drink mixer in position to engage the switch actuator button which extends through an elongate slot 58 defined in the body. Slot 58 is sized so that no part of the switch actuator mechanism contacts the body, and no part of the actuator mechanism needs to be removed or otherwise disturbed to mount or to remove body 44 from the drink mixer. This facilitates easy mounting and removal of the splatter shield on the drink mixer and prevents damaging the switch actuator mechanism or the switch assembly during such operations.

Mounting means 52 includes a top flange 60 extending forwardly of body front surface 62 and rearwardly of body rear surface 64. One end of flange 60 is bent to form a container retaining front flange 66 which extends parallel to the body toward the body bottom edge, and a second end of the top flange is bent to form a rear flange 68 which extends parallel to the body away from the body bottom edge. The front flange retains a cup on the drink mixer and covers body slot 58 to prevent material from splashing out of the container and onto the switch mechanism via slots 58 and 32 which are aligned when the splatter shield is mounted on the drink mixer.

Rear flange 68 is positioned and sized to engage the inner surface of the frontwall adjacent to slot 32. Body 44 is thus supported on the standard frontwall by the mounting bolt and the rear flange of mounting means 52, and can be easily and quickly mounted on and removed from the standard frontwall. Original manufacturing of body 44 can be carried out using a minimum number of steps, and the ease with which the body is associated with the standard frontwall permits easy assembly and facilitates cleaning by the user.

The splatter shield body is supported in position on the frontwall by a planar mounting pad 70 and vibration dampers 72. The mounting pad and the vibration dampers engage body rear surface 64 to space the body with respect to the frontwall to keep rear flange 68 engaged with the frontwall inner surface whereby the body is securely held on the standard. The mounting pad serves the dual purpose of spacing the body from the frontwall and serving as the means for engaging mounting bolt 46, and thus is located near the body bottom edge. The vibration dampers serve a dual purpose of spacing the body from the frontwall and maintaining the rear flange in secure engagement with the frontwall and thus are located between mounting pad 70 and slot 58.

A body locator means 76 can also be used for assuring proper positioning of the body on the frontwall. The locator means 76 preferably includes a locator pin 78 extending outwardly from mounting pad 70 to be received by a locator aperture 80 defined in the body. The locator means can be used for locating the body on the standard frontwall and for holding that body in position while the mounting bolt is being engaged with the frontwall.

Figure 2:
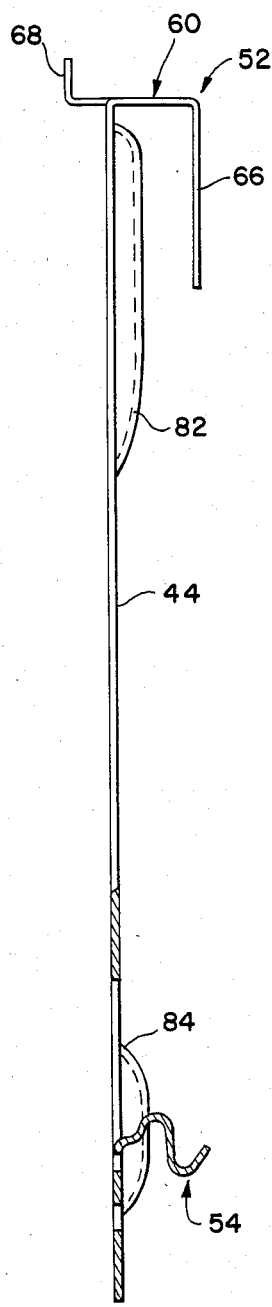
FIG. 2 is an alternative form of the splatter shield which includes container positioning projections.
Figure 3:
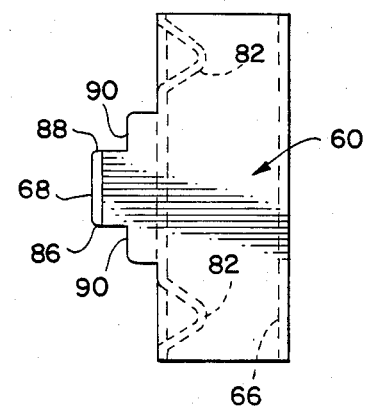
FIG. 3 is a top view of the splatter shield shown in FIG. 2 but which also illustrates a splatter shield positioning means which can be used on either the FIG. 1 or the FIG. 2 embodiments of the splatter shield.

As shown in FIGS. 3 and 4, the splatter shield body can include container locating means for cooperating with container support 54 to hold the container in the desired position on the drink mixer. The container locating means includes projections 82 and 84 located on both sides of the slot 58 and on both sides of the container support 54. The projections are appropriately sized and shaped to securely engage the container. Both of the projections 82 are also shown in FIG. 3, and only one of the two projections 84 is shown in FIG. 2.

FIG. 3 illustrates a splatter shield positioning means on the top flange for positioning body 44 with respect to the slot in the frontwall and with respect to the frontwall front surface. Rear flange 68 is sized to have a width as measured between sides 86 and 88 essentially equal to the width of slot 32 in the frontwall so flange 68 snugly engages the frontwall adjacent to the slot 32. This feature permits flange 68 to serve a positioning function as well as a mounting function whereby the snug engagement of flange 68 causes body 44 to be oriented in a desired position as soon as the flange 68 is located in slot 32. Top flange 60 can be shaped to include shoulders 90 which engage the frontwall front surface when the body is properly spaced from that frontwall front surface. Thus, the shoulders 90 work in conjunction with the mounting pad and the vibration dampers to properly space the body from the frontwall. This feature can be used with either the FIG. 1 embodiment or the embodiment shown in FIG. 2.

INDUSTRIAL APPLICABILITY

The splatter shield of the present disclosure can be formed of stainless steel or other such material, and is most useful in conjunction with a drink mixer of the type disclosed in U.S. Pat. No. 4,351,612. However, other materials and other drink mixers can be used without departing from the scope of the present disclosure. The splatter shield can be sized to cover a portion of the frontwall, or most of the frontwall, as required, and can be of rectangular or other suitable shape. The splatter shield can be planar or curved as required without departing from the teachings of this disclosure. To mount the splatter shield on a drink mixer, the rear flange 68 is inserted through the slot 32 above the switch actuator button to engage the inner surface of the standard frontwall. The splatter shield is then secured to the standard frontwall by engaging the single mounting bolt 46, and the simple operation of engaging this one mounting bolt secures the splatter shield, the container support 54 and the container retaining front flange 66 in proper position relative to the switch actuator button 28. Disengagement of this single mounting bolt facilities the simple removal of the splatter shield, container support and container retaining front flange as a single unit for cleaning.

I claim:

1. A splatter shield for use with an electric drink mixer of the type having an upright hollow standard in which is housed a switch assembly for operating a motor when a container contacts a switch actuator mechanism extending through a slot in a frontwall of the standard, the splatter shield comprising:
   a one-piece body means for overlying the frontwall and supporting the container in position on the drink mixer, said body means including
   (1) a body mounting means which is unitary with said body means for releasably mounting said body means on the standard, said body mounting means including a standard frontwall engaging means for extending through the slot in the in the front wall of the hollow standard and into engagement with an inner surface of the frontwall, adjacent to the slot in the frontwall, to hold the body means on the standard;
   (2) a container support means which is integral with said body means for supporting a container in position to contact the switch actuator mechanism; and
   (3) an elongate body means slot through which the actuator mechanism extends when said body means is mounted on the drink mixer, said body means slot being larger than the switch actuator mechanism so that said body means is spaced from said switch actuator mechanism in a manner eliminating the need for any part of said switch actuator mechanism to be removed in order to move said body means onto or away from the frontwall.

2. The splatter shield defined in claim 1 wherein said standard frontwall engaging means includes a top flange integrally attached to one end of said body means, said top flange including an end extending essentially parallel to said body means and located to contact the inner surface of the frontwall adjacent to the slot in the frontwall.

3. The splatter shield defined in claim 2 wherein said top flange includes a second end extending essentially parallel to said body means and located to cover the switch actuator mechanism and said body means slot for preventing material from entering the standard through said body means slot and the frontwall slot.

4. The splatter shield defined in claim 3 further including container positioning means which is one-piece with said body means for locating the container on said body means in a predetermined position.

5. The splatter shield defined in claim 4 wherein said positioning means includes a first projection located adjacent to said body means slot and a second projection located adjacent to said container support means.

6. The splatter shield defined in claim 2 further including splatter shield positioning means on said top flange for positioning said body means with respect to the slot in the frontwall and with respect to an outer surface of the frontwall.

7. The splatter shield defined in claim 6 wherein said splatter shield positioning means further includes a shoulder on said top flange for engaging the frontwall outer surface.

* * * * *